United States Patent [19]

Koga

[11] Patent Number: 4,521,986

[45] Date of Patent: Jun. 11, 1985

[54] NET FABRIC FOR TRAWLING

[76] Inventor: Tatsumi Koga, 40 Victoria Heights, Nelson, New Zealand

[21] Appl. No.: 633,895

[22] Filed: Jul. 24, 1984

[30] Foreign Application Priority Data

Sep. 19, 1983 [JP] Japan .............................. 58-172841

[51] Int. Cl.³ ............................................. A01K 73/02
[52] U.S. Cl. ......................................... 43/9; 428/255; 428/256
[58] Field of Search ............... 428/105, 107, 108, 221, 428/224, 225, 247, 255, 256; 43/9

[56] References Cited

U.S. PATENT DOCUMENTS 4,089,071  5/1978  Holmberg et al. .................. 428/247
4,157,411  6/1979  Thomson ............................ 428/256

Primary Examiner—James J. Bell
Attorney, Agent, or Firm—Browdy and Neimark

[57] ABSTRACT

A net fabric for a trawl net formed by metal net legs and resistance plates. The metal net legs forming meshes are connected at their intersections to the resistance plates which resist the flow of water and these plates have curved surface and are provided with four or more devices for attaching said metal net legs around the peripheral edge thereof. The resistance plates make it possible to spread the trawl net vertically and horizontally and keep the shape thereof efficiently, and thus a net fabric which is very efficient when used in a trawl net can be provided utilizing the advantages of a metal net fabric with excellent durability and less water resistance in conjunction with its threatening effect to the fish.

9 Claims, 4 Drawing Figures

NET FABRIC FOR TRAWLING

BACKGROUND OF THE INVENTION

1. Field of the Invention

The present invention relates to an improvement of the net fabric for trawling.

2. Description of the Prior Art

It is already well known that net fabrics could be made of metal materials to improve the abrasion resistance and drying property thereof, and also to increase the specific gravity. However, the net fabric made of metal materials are utilized in practice only for the fixed nets, fish or seaweed farming nets, etc...

Based on long experience in the trawling industry and various experiments, the inventor has reached the conclusion that metal net fabric has a remarkable threatening effect on the school of fish, and has investigated the method to adopt metal net fabric which has a greater threatening power for the wing part and forward part of body of the trawl net.

However, in practice, it is very hard to maintain the net mouth in a widely opened position and keep the trawl net in proper shape when it is towed, due to the greater specific gravity of metal net fabric.

SUMMARY OF THE INVENTION

The present invention is designed to remove these faults, so that the first object of this invention is to provide an efficient net fabric for a trawl net which, although being made of metal with a large specific gravity, enables efficient maintenance of both widely opened net mouth and proper shape as trawl net, while making the most of the advantages of this netting such as durability, less water resistance and increased threatening power against fish by means of installing small resistance plates at the intersections of metal net legs.

The second characteristic of the present invention is that it can provide a net fabric for a trawl net which enables the most efficient spreading performance of the metal net and can form the most suitable trawl shape in accordance with the different requirements at each part of the trawl net by means of selecting and adjusting the size, shape and weight of material used for the resistant plates connecting each leg of the metal net.

The third characteristic of the present invention is that it can provide a net fabric for a trawl net which makes it possible to facilitate an increase or decrease in the number of metal net legs connected to the resistance plates, and the number of meshes thereof.

Other characteristics of the present invention will be clear in the detailed description of an embodiment thereof given below.

DESCRIPTION OF THE PREFERRED EMBODIMENT

In this embodiment of the present invention, a net fabric (1) is formed of metal net wires (2) which are stranded or braided or flexible single wires made of stainless steel or any other metal, and of resistance plates (3) connecting the intersections of those wires. The resistance plates (3) can be of any shape, including discoidal, elliptical, rectangular, single plate or airfoil, and be made of a metal such as stainless steel or aluminium, or synthetic resin, etc., and the dimensions of each plate vary according to the part of the trawl net in which it is employed. It is preferable, for instance, that larger plates are employed at the wing and the vicinity of net mouth. When discoidal plates are employed, the diameter thereof preferably between approximately 2 to 30 cm.

Figure 1:
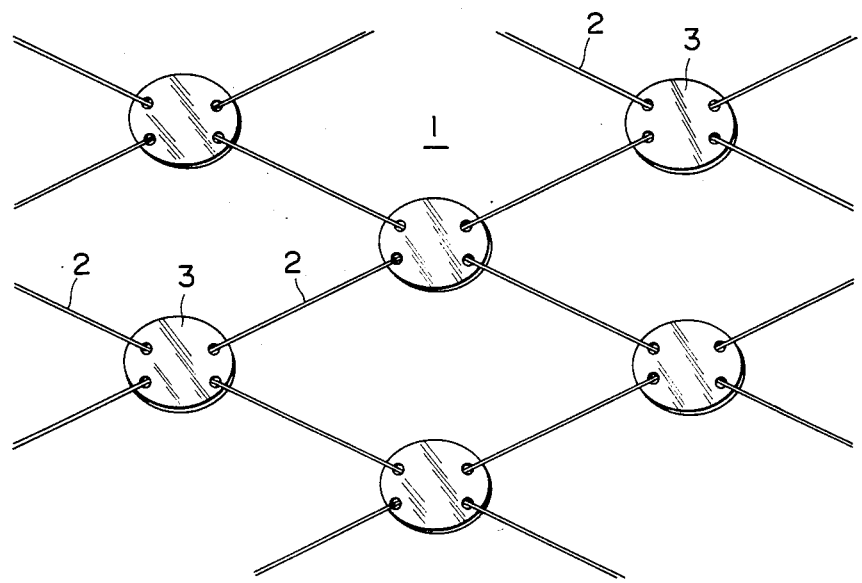
FIG. 1 is a front view of this invention.
Figure 2:
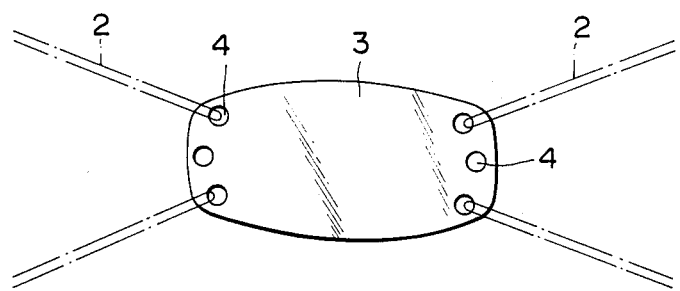
FIG. 2 is a front view of a resistance plate of this invention.
Figure 3:
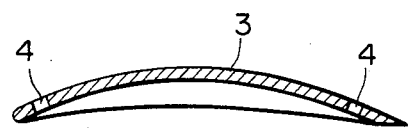
FIG. 3 is a cross section.
Figure 4:
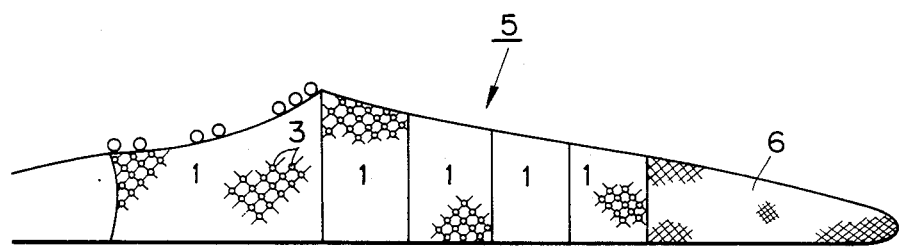
FIG. 4 is a side view of this invention when applied to a trawl.

The effects of the resistance plate (3) in spreading the net or maintaining the shape thereof are further enhanced when the section has an airfoil shape as shown in FIG. 3, so that the lifting power of the plate against flowing water is increased. There is provided, around the edge of each resistance plate (3) four or more holes (4) for attaching the metal net wires (2), the numbers of the attached wires (2) can be increased or decreased, and thereby an increase or decrease of meshes is facilitated.

The materials of the resistance plate (3) can vary according to the places at which they are applied. For instance, resistance plates of synthetic resin or the like, which are lighter in weight than those used in the bottom part of the net, can be used suitably in the upper part.

The net fabric of the present invention can be used in all or part of the portions of various trawls (5), including both bottom trawl net and mid water trawl net etc. except for a cod end (6) thereof, and, if required, it can be used for only a part of the body net together with conventional synthetic fiber net.

Because the net fabric of the present invention is constructed as described above, the resistance plates can efficiently spread the net fabric, even a metal net which has larger specific gravity, and open the net mouth easily and widely, by utilizing the resistance to flowing water generated as the net is towed through the water, as in trawling. At the same time, the metal wire legs can intimidate the fish so as to drive them from the center part of the body net into the cod end. Accordingly, schools of fish can be caught surely without dispersing, even with net fabric having large mesh size, and thus trawling operation can be performed efficiently employing less towing power.

Since the netting material of the present invention is made of metal, damage to the net is less than that to a conventional trawl net made of synthetic fibers. The durability of the net can be increased, and can give preferable water resistance, while the easy connection of the resistance plates to the metal net legs makes it easy to reduce or increase the meshes so that the net can form a proper shape for trawling. Thus this netting material has superior characteristics which makes it possible to adapt metal net fabric to trawl nets.

What is claimed is:

1. A net fabric for a trawling net, comprising:
   metallic net legs forming meshes, and plates for connecting said net legs at their intersections, said plates resisting the flow of water through the net.

2. A net fabric for a trawling net, comprising:
   metallic net legs forming meshes, and plates for connecting said net legs at their intersections, said plates having a curved surface which resists the flow of water through the net.

3. The net fabric for trawling described in claim 1, wherein four or more devices for attaching said net legs are provided in the peripheral part of each said plates resisting the flow of water.

4. The net fabric for trawling described in claim 2, wherein four or more devices for attaching said net legs are provided in the peripheral part of each said plates resisting the flow of water.

5. In a trawling net to be towed through water including metal strands intersecting one another at intersection points to form a net mesh, the improvement comprising:
  means, disposed at each of said interconnection points, for connecting intersecting strands, said connecting means consisting of a plate and defining means for providing substantially greater resistance to water flowing through said net than said strands.

6. The improvement of claim 5, wherein said plate has an airfoil configuration including a major convex surface and a major concave surface, said convex surface facing away from the interior of said trawlng net and defining means for developing a force, proportional in magnitude to the towing speed of the net through the water, for urging said plate in the direction of said major convex surface.

7. The improvement of claim 5, wherein said plate has two sets of openings, at the periphery thereof, for securing said intersecting strands.

8. The improvement of claim 7, wherein each set includes two openings.

9. The improement of claim 7, wherein each set includes three openings.

* * * * *